United States Patent
Fan (10) Patent No.: US 11,924,741 B2
(45) Date of Patent: Mar. 5, 2024

(54) AUXILIARY ROUTING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/218,449

(22) Filed: Jul. 5, 2023

(65) Prior Publication Data
US 2023/0354154 A1 Nov. 2, 2023

Related U.S. Application Data

(63) Continuation of application No. PCT/CN2021/070445, filed on Jan. 6, 2021.

(51) Int. Cl.
*H04W 40/28* (2009.01)
*H04L 45/58* (2022.01)
*H04W 12/72* (2021.01)

(52) U.S. Cl.
CPC .......... *H04W 40/28* (2013.01); *H04L 45/58* (2013.01); *H04W 12/72* (2021.01)

(58) Field of Classification Search
None
See application file for complete search history.

(56) References Cited

U.S. PATENT DOCUMENTS

| | | | |
|---|---|---|---|
| 2018/0199279 A1 | 7/2018 | Baek et al. | |
| 2019/0075452 A1 | 3/2019 | Avula et al. | |
| 2020/0154352 A1* | 5/2020 | Baek | H04W 48/06 |
| 2020/0163132 A1 | 5/2020 | Li et al. | |
| 2020/0214070 A1 | 7/2020 | Ingale et al. | |
| 2020/0280854 A1* | 9/2020 | Kunz | H04W 12/06 |
| 2021/0219355 A1* | 7/2021 | Lindheimer | H04W 76/11 |

(Continued)

FOREIGN PATENT DOCUMENTS

| | | |
|---|---|---|
| CN | 109964509 A | 7/2019 |
| CN | 110169098 A | 8/2019 |
| CN | 110650500 A | 1/2020 |

(Continued)

OTHER PUBLICATIONS

International Search Report issued in international application No. PCT/CN2021/070445, dated Aug. 19, 2021.

(Continued)

*Primary Examiner* — Diane L Lo
(74) *Attorney, Agent, or Firm* — BAYES PLLC (57) ABSTRACT

The present application relates to an auxiliary routing method, a terminal device, and a network device. The method comprises: a terminal device sending first indication information to a network device, so that the network device selects a first network function entity according to the first indication information, wherein the first network function entity is related to one or more specified functions. By means of the embodiments of the present application, a routing mechanism for a network function entity can be optimized.

20 Claims, 3 Drawing Sheets

```
                                        ┌─ S201
┌─────────────────────────────────────────┐
│ The network device receives first indication information sent by │
│                the terminal device                               │
└─────────────────────────────────────────┘
                                        ┌─ S202
┌─────────────────────────────────────────┐
│ The network device selects a first network function entity       │
│ according to the first indication information, where the first   │
│ network function entity is related to one or more designated     │
│                      functions                                   │
└─────────────────────────────────────────┘
```

(56) References Cited

U.S. PATENT DOCUMENTS

2021/0368547 A1* 11/2021 Kadiri .................. H04L 5/0044
2023/0189187 A1*  6/2023 Velev ................... H04W 48/20
                                                    455/435.1

FOREIGN PATENT DOCUMENTS

| CN | 110881184 A  | 3/2020 |
| CN | 111436090 A  | 7/2020 |
| EP | 3639542 A1   | 4/2020 |

OTHER PUBLICATIONS

Written Opinion of the International Searching Authority issued in international application No. PCT/CN2021/070445, dated Aug. 19, 2021.
Intel Corporation, "RAN2 impact on Non-Public Network Deployment using SNPN", R2-1900760, 3GPP TSG RAN WG2 Meeting #105 Athens, Greece, Feb. 25-Mar. 1, 2019.
3GPP TS 38.331 V16.2.0 (Sep. 2020); Technical Specification Group Radio Access Network; NR; Radio Resource Control (RRC) protocol specification (Release 16).
Extended European Search Report issued in corresponding European application No. 21916739.2, dated Dec. 13, 2023.
Source: Ericsson; Title: TP for Assistance information for network slice selection in RRC; 3GPP TSG-RAN WG3 AH #2 Tdoc R3-172556; Qingdao, China, Jun. 27-29, 2017.

* cited by examiner

A terminal device sends first indication information to a network device, so that the network device selects a first network function entity according to the first indication information, wherein the first network function entity is related to one or more specified functions

AUXILIARY ROUTING METHOD, TERMINAL DEVICE, AND NETWORK DEVICE

CROSS-REFERENCE TO RELATED APPLICATION

This application is a continuation of International Application No. PCT/CN2021/070445, filed Jan. 6, 2021, the entire contents of which are incorporated herein by reference.

TECHNICAL FIELD

The present application relates to the field of communications, and more particularly, to an auxiliary routing method, a terminal device and a network device.

BACKGROUND

Non-public Network (NPN) may include Stand-alone Non-public Networks (SNPN) and Closed Access Group (CAG). Public Land Mobile Network (PLMN) can support any network sharing combination mode of ordinary public network, SNPN network and CAG network at the same time. At present, the deployment of NPN networks such as SNPN and CAG is becoming more and more flexible. In some cases, for example, when being authorized by the operator, a third-party network can deploy its own NPN network to provide certain types of services or functions for user terminals. However, since the routing assistance information currently available from the terminal side to the network side cannot fully meet the AMF routing requirements corresponding to such services or functions, there is unnecessary resource overhead caused by AMF routing errors, and the service waiting time of the terminal is too long, which affects the system performance.

SUMMARY

In view of this, the embodiments of the present application provide an auxiliary routing method, a terminal device and a network device, which can be used to assist the routing of the network function entity.

The embodiments of the present application provide an auxiliary routing method, which is applied to a terminal device, including:
sending, by the terminal device, first indication information to a network device, for the network device to select a first network function entity according to the first indication information, where the first network function entity is related to one or more designated functions.

The embodiments of the present application provide an auxiliary routing method, which is applied to a network device, including:
receiving, by the network device, first indication information sent by a terminal device; and
selecting, by the network device, a first network function entity according to the first indication information, where the first network function entity is related to one or more designated functions.

The embodiments of the present application also provide a terminal device, including:
a sending module, configured to send first indication information to a network device, where the first indication information is used by the network device to select a first network function entity according to the first indication information, and the first network function entity is related to one or more designated functions.

The embodiments of the present application also provide a network device, including:
a receiving module, configured to receive first indication information sent by a terminal device; and
a selection module, configured to select a first network function entity according to the first indication information, where the first network function entity is related to one or more designated functions.

The embodiments of the present application further provide a terminal device, including: a processor, a memory, and a transceiver, where the memory is configured to store a computer program, and the processor invokes and runs the computer program stored in the memory to control the transceiver to perform the methods as described above.

The embodiments of the present application further provide a network device, including: a processor, a memory, and a transceiver, where the memory is configured to store a computer program, and the processor invokes and runs the computer program stored in the memory to control the transceiver and the processor to cooperate so as to perform the methods as described above.

The embodiments of the present application further provide a chip, including: at least one processor circuit, configured to call and run a computer program from a memory, so that a device installed with the chip performs the above methods.

The embodiments of the present application further provide a computer-readable storage medium for storing a computer program, where the computer program causes a computer to perform the methods as described above.

The embodiments of the present application also provide a computer program product, including computer program instructions, where the computer program instructions cause a computer to perform the methods as described above.

The embodiments of the present application also provide a computer program, and the computer program enables a computer to perform the methods as described above.

According to the embodiments of the present application, the terminal device can inform the network device of its desired function information, and based on this, the network device can select an appropriate network function entity for the terminal device to perform data routing, which can reduce the number of times of attempts to inappropriate network function entity, optimize the routing mechanism of the network function entity, thus compressing the delay, and avoiding the degradation of the user experience caused by the long delay to a certain extent.

DETAILED DESCRIPTION

The technical solutions in the embodiments of the present application will be described below with reference to the accompanying drawings in the embodiments of the present application.

The technical solutions of the embodiments of the present application can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an evolution system of NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), a fifth-generation communication (5th-Generation, 5G) system or other communication systems, etc.

Generally speaking, traditional communication systems support a limited number of connections, which are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present application can also be applied to these communication systems.

Optionally, the communication system in the embodiments of the present application may be applied to a Carrier Aggregation (CA) scenario, a Dual Connectivity (DC) scenario, or a Standalone (SA) network distribution scenario.

The embodiments of the present application describe various embodiments in conjunction with network device and terminal device, where the terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc.

The terminal device may be a station (STAION, ST) in the WLAN, may be a cellular phone, a cordless phone, a Session Initiation Protocol (SIP) phone, a Wireless Local Loop (WLL) station, a Personal Digital Assistant (PDA) device, a handheld device, a computing device with wireless communication capabilities or other processing devices, in-vehicle devices, wearable devices connected to wireless modems, a terminal device in the next-generation communication systems such as NR networks, or a terminal device in future evolved Public Land Mobile Network (PLMN) network, etc.

In the embodiments of the present application, the terminal device may be deployed on land, including indoor or outdoor, handheld, wearable, or vehicle-mounted; it may also be deployed on water (such as ships, etc.); it may also be deployed in the air (such as airplanes, balloons, and satellites).

In the embodiments of the present application, the terminal device may be a mobile phone, a tablet computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or a wireless terminal device in smart home, etc.

As an example and not a limitation, in the embodiments of the present application, the terminal device may also be a wearable device. The wearable device may also be called a wearable smart device, which is a general term for wearable devices which are developed by intelligently designing daily wear by applying wearable technology, such as glasses, gloves, watches, clothing and shoes. The wearable device is a portable device that is worn directly on the body, or integrated into the user's clothing or accessories. The wearable device is not only a hardware device, but also achieves powerful functions through software support, data interaction, and cloud interaction. Generalized wearable smart devices include full-featured and large-sized devices that can achieve complete or partial functions without relying on smartphones, such as smart watches or smart glasses, and devices that focus only on a certain type of application function and need to be used in conjunction with other devices (e.g., smartphones), such as various types of smart bracelets and smart jewelry for physical sign monitoring.

In the embodiments of the present application, the network device may be a device for communicating with a mobile device, and the network device may be an Access Point (AP) in WLAN, or a base station (Base Transceiver Station, BTS) in GSM or CDMA, it may also be a base station (NodeB, NB) in WCDMA, it may also be an evolutional base station (Evolutional Node B, eNB or eNodeB) in LTE, or a relay station or access point, or an in-vehicle device, a wearable device and a network device (gNB) in the NR network or a network device in a future evolutional PLMN network, etc.

As an example and not a limitation, in the embodiments of the present application, the network device may have a mobile characteristic, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station set in a location such as land or water.

In the embodiments of the present application, the network device may provide services for a cell, and the terminal device communicates with the network device through transmission resources (for example, frequency domain resources, or spectrum resources) used by the cell, and the cell may be a cell corresponding to the network device (for example, the base station), the cell may belong to the macro base station, or it may belong to the base station corresponding to the small cell. The small cell here may include a Metro cell, a Micro cell, a Pico cell, a Femto cell, etc. These small cells have the characteristics of small coverage and low transmission power, and are suitable for providing high-speed data transmission services.

Figure 1:
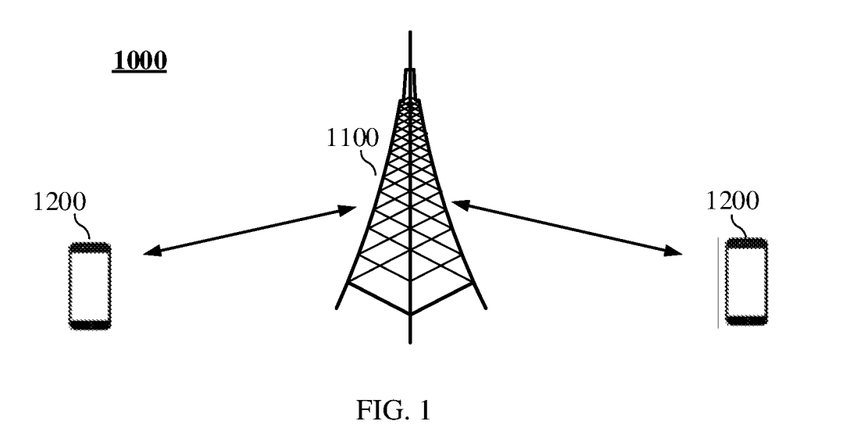
FIG. 1 is a schematic diagram of a communication system architecture according to an embodiment of the present application.

FIG. 1 schematically shows one network device 1100 and two terminal devices 1200. Optionally, the wireless communication system 1000 may include a plurality of network devices 1100, and the coverage of each network device 1100 may include other numbers of terminal device, which is not limited in the embodiments of the present application. Optionally, the wireless communication system 1000 shown in FIG. 1 may also include other network entities such as a Mobility Management Entity (MME), an Access and Mobility Management Function (AMF), which is not limited in the embodiments of the present application.

It should be understood that the terms "system" and "network" are often used interchangeably herein. The term "and/or" in the present disclosure is only an association relationship for describing the associated objects, indicating that there may be three kinds of relationships, for example, A and/or B may mean the following three cases: A exists alone, A and B exist at the same time, and B exists alone. The character "/" in the present disclosure generally indicates that the related objects have an "or" relationship. In the description of the embodiments of the present application, the term "corresponding" may indicate that there is a direct or indirect corresponding relationship between the two things, or may indicate that there is an associated relationship between the two things, or may represent relationships of indicating and being indicated, configuring and being configured, etc.

In order to clearly illustrate the idea of the embodiments of the present application, firstly, the related content of the AMF routing of the network in the communication system is briefly described.

1) About the Deployment Characteristics of NPN Network

Figure 2:
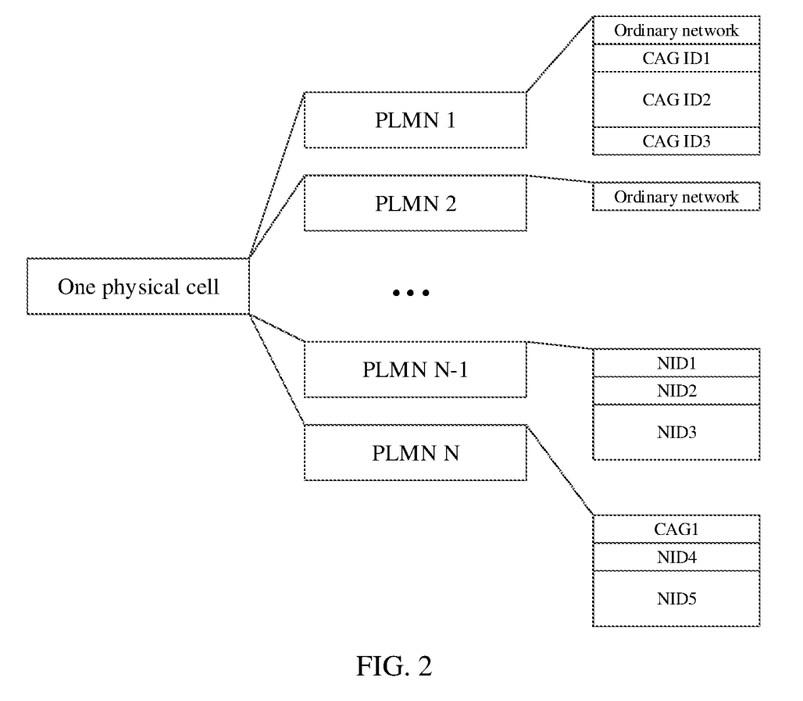
FIG. 2 is a schematic diagram of a networking combination relationship among the ordinary public network, the SNPN and the CAG networks.

In the NR system, Public Land Mobile Network (PLMN) can support any network sharing combination mode of the ordinary public network, SNPN network and CAG network at the same time, for example, one PLMN can support the ordinary public network or SNPN or CAG network alone, it is also supported that the ordinary public network and SNPN share one PLMN network, even the ordinary public network, SNPN and CAG network sharing one PLMN network at the same time is allowed. FIG. 2 can reflect the networking combination relationship of the ordinary public network, SNPN and CAG networks. One physical cell can be shared by a plurality of PLMN networks at the same time, and each PLMN logical cell can constitute its own unique non-public network. For example, in FIG. 2, an ordinary public network and three different CAG sub-networks are deployed in the PLMN1 logical cell, and only three SNPN sub-networks are deployed in the PLMN N−1 logical cell, that is to say, any network sharing combination of ordinary public network, SNPN and CAG networks can be freely deployed under one PLMN, in which PLMN ID and NID are used to identify the SNPN network, and PLMN ID and CAG ID are used to identify the CAG network. However, according to existing regulations, the number of independent SNPN sub-networks, the number of independent CAG sub-networks, or the number of SNPN+CAG sub-networks deployed in one physical cell should not exceed 12.

2) About Suitable Cell

A suitable cell is a cell where the terminal may normally camp.

3) About Frequency Point Priority

When configuring one frequency point on the network side, the frequency point priority information may be configured at the same time. The value of the frequency point priority ranges from 0 to 7. 0 represents the lowest priority, and 7 represents the highest priority. For the diversity of frequency point priority configuration, it is further specified that each value in 0 to 7 may be associated with a decimal place value, and the value range of the decimal place may be {0.2, 0.4, 0.6, 0.8}. There are a total of 40 frequency point priority combinations of the integer place and the decimal place.

The frequency point priority may be configured through system information or dedicated signaling. The frequency point priority configured by the dedicated signaling is associated with a valid duration. During the valid duration, the dedicated frequency point priority always covers the public frequency point priority of system information broadcasting; when the valid duration expires, the terminal can only use the public frequency point priority.

4) Rules for Cell Selection and Cell Reselection of Terminals in NPN Networks

Regarding cell selection, if the cell selected by the terminal satisfies the suitable cell criterion, the terminal can choose to camp in the cell to complete the cell selection.

Regarding cell reselection, if the reselected target cell satisfies the suitable cell criterion and satisfies the reselection criterion condition defined based on the absolute frequency point priority, the terminal reselects to the corresponding cell that satisfies the aforementioned conditions to complete the cell reselection. The reselection criterion defined based on the absolute frequency point priority includes the following three criteria:
  a) high-priority frequency point reselection criterion;
  b) same priority frequency point reselection criterion or same frequency reselection criterion, also called R criterion;
  c) low-priority frequency point reselection criterion.

5) About Automatic Neighbor Relation (ANR)

The newly deployed cell may have an impact on the neighbor relation. The surrounding neighbor cell(s) cannot always obtain the latest neighbor relation information from Operation Administration and Maintenance (OAM). In the NR system, it is allowed that under configuration of the network side, the terminal reports neighbor related information obtained by itself, such as Cell Global Identifier (CGI) and Space Frequency Transmit Diversity (SFTD).

6) About Emergency Communication Service Indication on the Network Side

At present, the emergency communication service indication information on the network side is configured at the cell granularity, that is to say, all PLMNs supported by the cell share the same emergency communication service indication information, and these PLMNs either support emergency communication or do not support emergency communication. In addition, under the existing regulation, the SNPN network does not support the emergency communication service.

7) About the Routing Mechanism of AMF

According to the existing regulation, one NG-RAN may be connected to one or more AMFs, and different AMFs may provide different services or be maintained by different operators. In order to route the Non-access stratum (NAS) data of the terminal to the appropriate AMF entity, the terminal needs to provide one of the following information in the message 5 (Msg 5) of the random access procedure, the purpose is to assist the RAN side to select the appropriate AMF:

a) the PLMN and/or SNPN network identification number selected by the terminal NAS;

b) slice list information requested by the terminal;

c) AMF identification information that the terminal has registered.

At present, the deployment of NPN networks such as SNPN and CAG is becoming more and more flexible. Under the authorization of operators, third-party entities can deploy their own NPN networks. For example, third-party networks can provide the following services:

service 1: a service similar to officially deploying the network by the operator, such as registration and service communication;

service 2: a service of user authentication through the third-party access network, where the third-party access network notifies the terminal of the configuration requirement for using the service through system broadcast information, and the terminal that meets the condition can initiate the service request;

service 3: a service of online update of user subscription data through the third-party access network, where the third-party access network notifies the terminal of the configuration requirement for using the service through system broadcast information, and the terminal that meets the condition can initiate the service request.

For the above examples, with respect to service 1, the routing assistance information provided in the existing message 5 can meet the need of AMF routing at RAN side, but with respect to services 2 and 3, the routing assistance information provided in the existing message 5 cannot meet the AMF routing requirement. The reason is that the routing assistance parameter carried in the existing message 5 does not contain the meaning of the terminal requesting service 2 or service 3. In this case, the RAN side will select any one of AMFs to forward NAS data, which will result in the unnecessary resource overhead caused by AMF routing errors, also prolong the service waiting time of the terminal, affect the system performance, and ultimately lead to a decrease in user experience.

Figure 3:
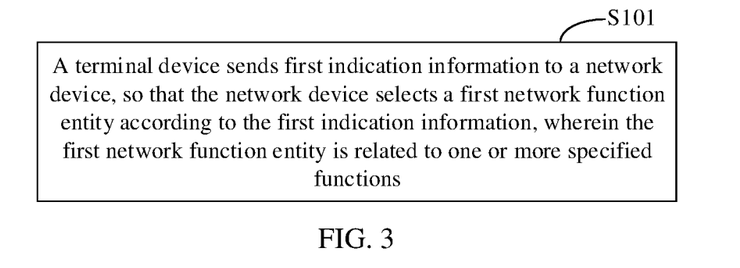
FIG. 3 is a flowchart of an auxiliary routing method on the terminal side according to an embodiment of the present application.

To this end, an embodiment of the present application provides an auxiliary routing method, which is applied to a terminal device. Referring to FIG. 3, the method includes the following steps.

In S101, a terminal device sends first indication information to a network device, so that the network device selects a first network function entity according to the first indication information, where the first network function entity is related to one or more designated functions.

Using the embodiments of the present application, the terminal device can inform the network of its desired function information, and the network side may select an appropriate network function entity for the terminal to perform routing according to the information, thereby reducing the resource overhead caused by the wrong routing of the network function entity, reducing the service waiting time of the terminal, improving the overall performance of the system, and improving the user experience.

Figure 4:
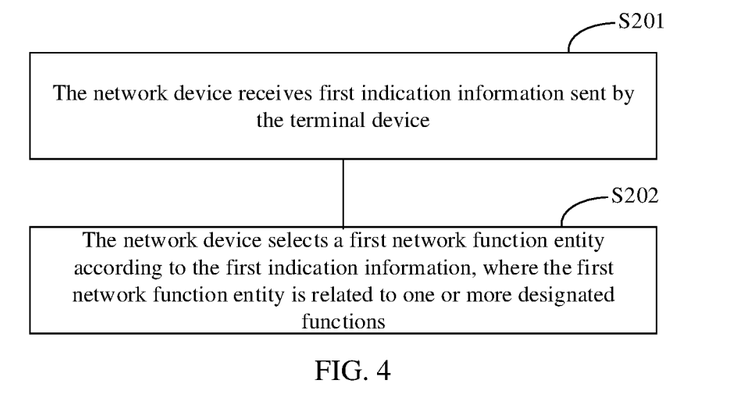
FIG. 4 is a flowchart of an auxiliary routing method on the network side according to an embodiment of the present application.

Correspondingly, an embodiment of the present application further provides an auxiliary routing method, which is applied to a network device. Referring to FIG. 4, the method includes the following steps.

In S201, the network device receives first indication information sent by the terminal device.

In S202, the network device selects a first network function entity according to the first indication information, where the first network function entity is related to one or more designated functions.

The embodiments of the present application can be used for routing assistance to the access and mobility management function (AMF), and can also be used for routing assistance to other suitable network function entities. Taking the routing assistance for AMF as an example, according to the auxiliary routing method of the embodiments of the present application, the terminal can inform the network side of the desired function or service by means of indication information, and the network side selects a suitable AMF service entity for the terminal based on the information. In this way, repeated attempts due to AMF routing errors can be avoided, unnecessary resource overhead can be reduced, the service waiting time of the terminal can be shortened, the overall performance of the system can be improved, and the user experience can be improved.

In different embodiments of the present application, the terminal device can notify the network side of indication information of its desired function or service in different ways. For example, the indication information may include a dedicated random access preamble, may also include information carried in the third step message Msg3 carried by Signaling Radio Bearer 0 (SRB0), and may also include information carried in the fifth step message Msg5 carried by SRB1. The indication manner may be an explicit indication or an implicit indication to inform the network side; the network side may learn the function or service expected by the terminal based on the indication information, so as to select a suitable network function entity (such as a suitable AMF service entity) for the terminal to realize the purpose of auxiliary routing. Various optional implementation manners of the embodiments of the present application are described below.

In some embodiments of the present application, optionally, the first indication information includes a random access preamble, and the random access preamble belongs to a first random access preamble set.

In some embodiments of the present application, optionally, the first random access preamble set is generated based on an independent random access root sequence.

In some embodiments of the present application, optionally, the first random access preamble set is generated based on a common random access root sequence.

In some embodiments of the present application, optionally, in the case that the first random access preamble set is generated based on a common random access root sequence, the random access preamble generated based on the common random access root sequence includes the first random access preamble set and a second random access preamble set, where the first random access preamble set is used for indicating the one or more designated functions, and the second random access preamble set is used for indicating other function(s).

In some embodiments of the present application, optionally, the first indication information is carried by Msg3, and the Msg3 is carried by the signaling radio bearer SRB0.

In some embodiments of the present application, optionally, the logical channel identification (ID) associated with the SRB0 corresponds to the one or more designated functions.

In some embodiments of the present application, optionally, one or more bits in the RRC message carried by the SRB0 correspond to the one or more designated functions.

In some embodiments of the present application, optionally, a plurality of bits in the RRC message carried by the SRB0 corresponding to the one or more designated functions, includes the following situations:
  a single bit in the plurality of bits in the RRC message carried by the SRB0 corresponds to a set formed by some of the one or more designated functions;
  a plurality of combinations of the plurality of bits in the RRC message carried by the SRB0 correspond to the one or more designated functions.

In some embodiments of the present application, optionally, a first access cause value (Cause Value) in the RRC message carried by the SRB0 corresponds to the one or more designated functions.

In some embodiments of the present application, optionally, the first indication information is carried by Msg5, and the Msg5 is carried by SRB1.

In some embodiments of the present application, optionally, one or more bits in the RRC message carried by the SRB1 correspond to the one or more designated functions.

In some embodiments of the present application, optionally, a plurality of bits in the RRC message carried by the SRB1 corresponding to the designated function, includes the following situations:
  a single bit in the plurality of bits in the RRC message carried by the SRB1 corresponds to a set formed by one or more designated functions in the designated functions;
  a plurality of combinations of the plurality of bits in the RRC message carried by the SRB1 correspond to the one or more designated functions.

In some embodiments of the present application, optionally, the Msg5 includes a first parameter, and the first parameter corresponds to the designated function.

In some embodiments of the present application, optionally, the Msg5 includes a second parameter, and a specified bit in the second parameter corresponds to the one or more designated functions, or a specified value in the second parameter corresponds to the one or more designated functions.

In some embodiments of the present application, optionally, a mapping relationship between the first indication information and the one or more designated functions includes at least one of the following: a one-to-one mapping, a one-to-many mapping, a many-to-one mapping.

In some embodiments of the present application, optionally, the one or more designated functions include: a function of a user performing an authentication service through a third-party entity and/or a function of a user's subscription data online update service.

In the embodiments of the present application, the designated function may also be referred to as a special function, which corresponds to the desired business or service of the terminal itself, such as the following scenarios:
  A. the terminal is ready to perform user authentication service through the current cell, the third-party access network may notify the terminal of the configuration requirement for using the service through system broadcast information, and the terminal meeting the condition can initiate the service request;
  B. the terminal is ready to perform the service of online update of user subscription data through the current cell, the third-party access network may notify the terminal of the configuration requirement for using the service through system broadcast information, and the terminal meeting the condition can initiate the service request.

It should be noted that the embodiments of the present application can be used in various suitable scenarios, and are not limited to the scenarios schematically listed above.

By using at least one of the above embodiments of the present application, the terminal can notify the network side of the desired function or service type through the dedicated random access preamble or the message 3 carried by SRB0 or the message 5 carried by SRB1, and the network side selects the appropriate AMF service entity for the terminal based on this information.

The implementation manner of the auxiliary routing method of the embodiment of the present application is described above through the embodiment, and the specific implementation process of the embodiment of the present application is described below through a plurality of specific examples.

First Embodiment: Using the Random Access Preamble

In this embodiment, auxiliary routing is implemented by using the random access preamble as the indication information, and two implementation manners are described below.

First manner multiplexing the existing random access preamble root sequence configuration.

In an implementation manner of the present application, the random access preamble root sequence configuration can be multiplexed, and part of the random access preambles needs to be separately allocated for use by a special function.

Figure 5:
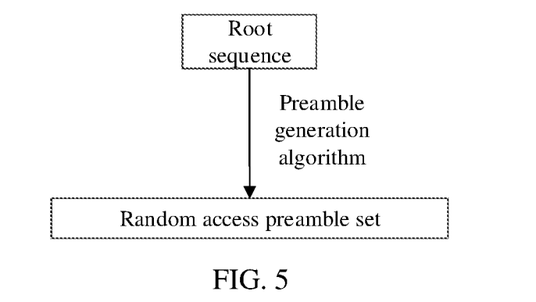
FIG. 5 is a schematic diagram of generating a random access preamble based on a root sequence.

FIG. 5 shows a schematic diagram of generation process of a random access preamble. A plurality of random access preambles may be generated based on the root sequence to form a random access preamble set. Table 1 shows a configuration method in which part of random access preambles are separately allocated for the special function, where the random access preamble set may include two subsets, such as random access preamble subset 1 and random access preamble subset 2 in Table 1, then the random access preamble subset 1 can be used for a common use, and the random access preamble subset 2 can be used for a special function.

TABLE 1

| Random access preamble set | Random access preamble subset 1 | Common use |
|---|---|---|
| | Random access preamble subset 2 | Special function use |

Specifically, in Table 1, the random access preamble set includes random access preamble subset 1 and random access preamble subset 2, random access preamble subset 1 is commonly used by other function(s) except the special function, and random access preamble subset 2 is used for special function use.

It should be noted that the mapping relationship between the random access preambles in random access preamble subset 2 and the special function may be a one-to-one mapping, a one-to-many mapping, or a many-to-one mapping, which is not limited here.

Second manner configuring a separate random access root sequence for special function.

In an implementation manner of the present application, a separate random access root sequence can be configured for a special function, and then, a method similar to FIG. 5 in the first manner can be used, and a dedicated random access preamble set can be generated based on the specially configured root sequence, and the random access preambles in the random access preamble set can be used for indicating the special function.

The mapping relationship between the dedicated random access preamble generated by the second manner and the special function may be a one-to-one mapping, a one-to-many mapping, or a many-to-one mapping, which is not limited here.

It can be seen that the main difference between the second manner and the first manner is that the random access root sequence used in the second manner is configured separately to indicate a special function, while the random access root sequence used in the first manner is multiplexing the common root sequence configuration, a part of the generated random access preambles is used for common use, and the other part is used for special function use.

Second Embodiment: Utilizing Message 3 Carried by SRB0

In this embodiment, the auxiliary routing is implemented by using the message 3 (the third step message, Msg3) carried by the SRB0 to carry the indication information, and various implementation manners are described below.

First manner defining a dedicated logical channel identification (ID) for a special function.

When SRB0 bearer is used, one logical channel ID is usually associated, and the logical channel ID is filled in the MAC subheader. In an implementation manner of the present application, upon receiving the MAC subheader containing different types of logical channel IDs on the network side, it is possible to determine which special function corresponds to the service initiated by the terminal.

The mapping relationship between the dedicated logical channel ID and the special function may be a one-to-one mapping, a one-to-many mapping, or a many-to-one mapping, which is not limited here.

Second Manner Defining a Dominant Bit in the RRC Message Carried by SRB0 for Identification Since the special function involved may include one or more special functions, in an implementation manner of the present application, the bit defined in the RRC message carried by the SRB0 may include one or more bits;

for the case where one bit is defined in the RRC message carried by SRB0, one or more special functions and the bit may be in a one-to-one or many-to-one mapping relationship;

for the case where a plurality of bits are defined in the RRC message carried by SRB0, the mapping relationship between one or more special functions and the defined plurality of bits may have various forms, which are described below:

Form 1: Bit Mapping Pattern Indication

In an implementation manner of the present application, one defined bit may be used to associate with one or more special functions, that is, each bit of the plurality bits in the RRC message carried by SRB0 may be associated with a set composed of some special functions in the one or more special functions. Table 2 schematically shows the association relationship between one defined bit and one or more special functions, where N is a positive integer greater than or equal to 1.

TABLE 2

| Bit 1 | Bit 2 | ... | Bit N |
|---|---|---|---|
| One or more special function sets 1 | One or more special function sets 2 | ... | One or more special function sets N |

Specifically, referring to Table 2, bit 1 defined in the RRC message carried by SRB0 corresponds to one or more special function sets 1, bit 2 defined in the RRC message carried by SRB0 corresponds to one or more special function sets 2, and so on.

Form 2: A Plurality of Bit Combination Indications

In an implementation manner of the present application, a plurality of bit combinations can be used for indicating one or more special functions. For example, three defined bits can represent 8 values, then each value may be associated with one or more special functions.

Third Manner Defining a New Access Cause Value in the RRC Message Carried by SRB0

In an implementation manner of the present application, one or more newly defined access cause values may be associated with one or more special functions. When the network side receives the RRC message carried by SRB0 including the newly defined access cause value, it can determine one or more special functions expected by the terminal, and based on this, it routes the terminal to a suitable network function entity such as AMF.

The mapping relationship between the access cause value and the special function may be a one-to-one mapping, a one-to-many mapping, or a many-to-one mapping, which is not limited here.

Third Embodiment: Utilizing Message 5 Carried by SRB1

In this embodiment, the auxiliary routing is implemented by using the message 5 (the fifth step message, Msg5) carried by the SRB1 to carry the indication information, and various implementation manners are described below.

First Manner Defining a Dominant Bit in the RRC Message Carried by SRB1 for Identification Similar to the second manner in the second embodiment described above, since the special function involved may include one or more special functions, in an implementation manner of the present application, the bit defined in the RRC message carried by SRB1 may include one or more bits.

For the case where one bit is defined in the RRC message carried by SRB1, one or more special functions and the bit may be in a one-to-one or many-to-one mapping relationship.

For the case where a plurality of bits are defined in the RRC message carried by SRB1, the mapping relationship between one or more special functions and the defined plurality of bits may be in various forms, and the above-described two forms provided in the second manner in second embodiment can be adopted, namely form 1 (bit mapping pattern indication) and form 2 (a plurality of bit combination indications), the specific content will not be described repeatedly.

Second Manner Implicit Indication Using a Relevant Parameter

In an implementation manner of the present application, an implicit indication may be achieved through some parameters. For example, if one or some parameters contained in message 5 are associated with the special function expected by the terminal, it can be set that if one or more of these parameters appear in the message 5, it implicitly indicates that the terminal is initiating a service corresponding to one or more special functions related to this parameter.

Third Manner Indication by Using a Value Range of the Parameter

In an implementation manner of the present application, the indication may be realized by using the value range of one or some parameters. For example, the legal value range of some parameters in message 5 is clearly specified. Here, the corresponding behavior when the parameter takes an illegal value can be further specified. For example, if one parameter is an enumeration type parameter with 8 pre-defined spaces, but only the first 4 spaces are used in the current protocol, and the last 4 spaces are undefined, then it may be specified that when the values of the last 4 spaces appear, it indicates that the terminal is initiating a service corresponding to one or more special functions preset corresponding to the parameter (or the space of the parameter). The mapping relationship between the illegal value and the special function may be a one-to-one mapping, a one-to-many mapping, or a many-to-one mapping, which is not limited here.

The indication manners mentioned in the above-mentioned different implementation manners of the present application can be used in combination, and further, the mapping relationships between the indication information and the special functions in the different implementation manners may be a one-to-one mapping, or a one-to-many mapping, or a many-to-one mapping, all of which can achieve the purpose of the embodiments of the present application.

Figure 6:
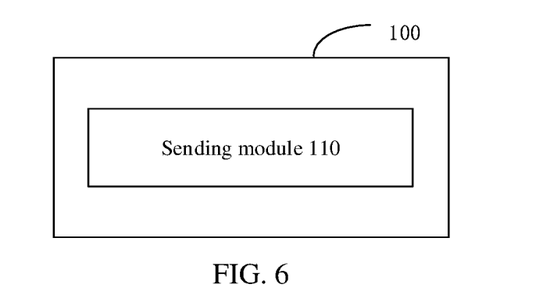
FIG. 6 is a schematic structural block diagram of a terminal device according to an embodiment of the present application.

The specific settings and implementation manners of the embodiments of the present application have been described above through a plurality of embodiments from different perspectives. Corresponding to the processing method of the above at least one embodiment, an embodiment of the present application further provides a terminal device 100. Referring to FIG. 6, the terminal device 100 includes:

a sending module 110, configured to send first indication information to a network device, where the first indication information is used by the network device to select a first network function entity according to the first indication information, and the first network function entity is associated with one or more designated functions.

Figure 7:
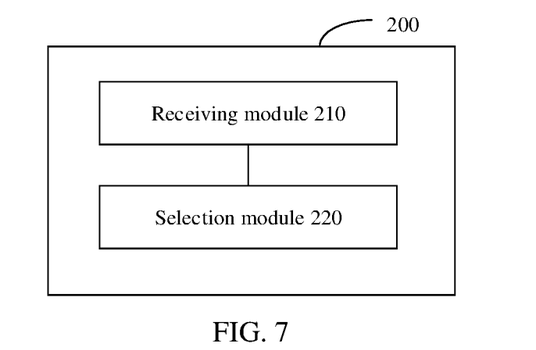
FIG. 7 is a schematic structural block diagram of a network device according to an embodiment of the present application.

Corresponding to the processing method of at least one embodiment above, an embodiment of the present application further provides a network device 200. Referring to FIG. 7, the network device 200 includes:

a receiving module 210, configured to receive first indication information sent by the terminal device;

a selection module 220, configured to select a first network function entity according to the first indication information, where the first network function entity is related to one or more designated functions.

For the terminal device 100 or the network device 200 in the embodiments of the present application, there are the following optional implementation manners.

Optionally, the first network function entity includes an access and mobility management function (AMF).

Optionally, the first indication information includes a random access preamble, and the random access preamble belongs to a first random access preamble set.

Optionally, the first random access preamble set is generated based on an independent random access root sequence, or the first random access preamble set is generated based on a common random access root sequence.

Optionally, when the first random access preamble set is generated based on the common random access root sequence, a random access preamble generated based on the common random access root sequence includes the first random access preamble set and a second random access preamble set, where the first random access preamble set is used for indicating the one or more designated functions, and the second random access preamble set is used for indicating other function(s).

Optionally, the first indication information is carried by the third step message Msg3, and the Msg3 is carried by the signaling radio bearer SRB0.

Optionally, the logical channel identification (ID) associated with the SRB0 corresponds to the one or more designated functions.

Optionally, one or more bits in the RRC message carried by the SRB0 correspond to the one or more designated functions.

Optionally, the plurality of bits in the RRC message carried by the SRB0 corresponding to the one or more designated functions, includes: a single bit in the plurality of bits in the RRC message carried by the SRB0 corresponds to a set composed of some designated functions in the one or more designated functions; or, various combinations of the plurality of bits in the RRC message carried by the SRB0 correspond to the one or more designated functions.

Optionally, a first access cause value in the RRC message carried by the SRB0 corresponds to the one or more designated functions.

Optionally, the first indication information is carried by the fifth step message Msg5, and the Msg5 is carried by SRB1.

Optionally, one or more bits in the RRC message carried by the SRB1 correspond to the one or more designated functions.

Optionally, the plurality of bits in the RRC message carried by the SRB1 corresponding to the designated function, includes: a single bit in the plurality of bits in the RRC message carried by the SRB1 corresponds to the set composed of one or more designated functions in the designated functions; or, various combinations of the plurality of bits in the RRC message carried by the SRB1 correspond to the one or more designated functions.

Optionally, the Msg5 includes a first parameter, and the first parameter corresponds to the designated function.

Optionally, the Msg5 includes a second parameter, and a specified bit in the second parameter corresponds to the one or more designated functions, or a specified value in the second parameter corresponds to the one or more designated functions.

Optionally, the mapping relationship between the first indication information and the one or more designated functions includes at least one of: a one-to-one mapping, a one-to-many mapping, or a many-to-one mapping.

Optionally, the one or more designated functions include: a function of the user performing an authentication service through a third-party entity and/or a function of a user subscription data online update service.

The terminal device 100 and the network device 200 in the embodiments of the present application can implement the corresponding functions of the terminal device in the foregoing method embodiments. For the procedures, functions, implementation manners, and beneficial effects corresponding to each module (sub-module, unit, or component, etc.) in the terminal device 100 and the network device 200, reference may be made to the corresponding descriptions in the foregoing method embodiments, which will not be repeated here.

It should be noted that the functions described by the respective modules (sub-modules, units, or components, etc.) in the terminal device 100 and the network device 200 in the embodiments of the present application may be implemented by different modules (sub-modules, units, or components, etc.), or may be implemented by the same module (sub-module, unit or component, etc.), for example, the first sending module and the second sending module may be different modules, or may be the same module, both can realize the corresponding functions in the embodiments of the present application. In addition, the sending module and the receiving module in the embodiments of the present application may be implemented by the transceiver of the device, and some or all of the other modules may be implemented by the processor of the device.

Figure 8:
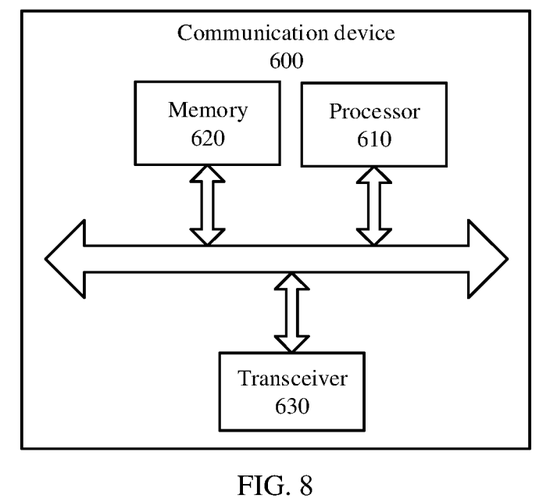
FIG. 8 is a schematic block diagram of a communication device according to an embodiment of the present application.

FIG. 8 is a schematic structural diagram of a communication device 600 according to an embodiment of the present application, where the communication device 600 includes a processor 610, and the processor 610 can call and run a computer program from a memory to implement the method in the embodiments of the present application.

Optionally, the communication device 600 may also include a memory 620. The processor 610 may call and run a computer program from the memory 620 to implement the methods in the embodiments of the present application.

The memory 620 may be a separate device independent of the processor 610, or may be integrated in the processor 610.

Optionally, the communication device 600 may further include a transceiver 630, and the processor 610 may control the transceiver 630 to communicate with other devices, specifically, may send information or data to other devices, or receive information or data sent by other devices.

The transceiver 630 may include a transmitter and a receiver. The transceiver 630 may further include antennas, and the number of the antennas may be one or more.

Optionally, the communication device 600 may be the network device of the embodiments of the present application, and the communication device 600 may implement the corresponding processes implemented by the network device in each method of the embodiments of the present application, which is not repeated here for brevity.

Optionally, the communication device 600 may be the terminal device in the embodiments of the present application, and the communication device 600 may implement the corresponding processes implemented by the terminal device in each method in the embodiments of the present application, which is not repeated here for brevity.

Figure 9:
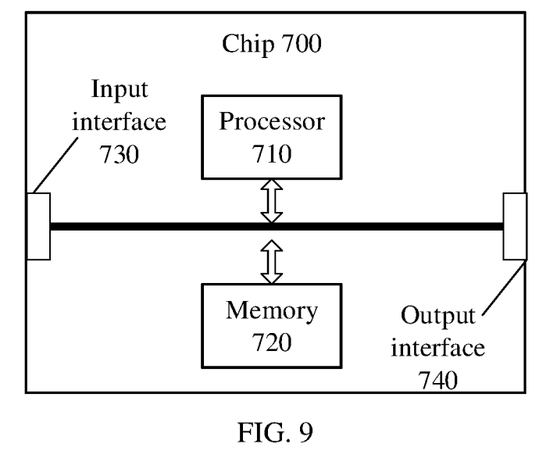
FIG. 9 is a schematic block diagram of a chip according to an embodiment of the present application.

FIG. 9 is a schematic structural diagram of a chip 700 according to an embodiment of the present application, where the chip 700 includes a processor 710, and the processor 710 can call and run a computer program from a memory to implement the method in the embodiments of the present application. The processor 710 may include at least one processor circuit.

Optionally, the chip 700 may further include a memory 720. The processor 710 may call and run a computer program from the memory 720 to implement the methods in the embodiments of the present application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device in the embodiments of the present application, and the chip may implement the corresponding processes implemented by the network device in each method of the embodiments of the present application, which is not repeated here for brevity.

Optionally, the chip may be applied to the terminal device in the embodiment of FIG. 6 of the present application, and the chip may implement the corresponding processes implemented by the terminal device in each method of the embodiments of the present application, which is not repeated here for brevity.

It should be understood that the chip mentioned in the embodiments of the present application may also be referred to as a system level chip, a system chip, a chip system, or a system-on-chip, or the like.

The above-mentioned processor may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either volatile memory or non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM).

It should be understood that the above memories are examples but not a limitative description, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM) and so on. That is, the memory in the embodiments of the present application is intended to include but not limited to these and any other suitable types of memory.

Figure 10:
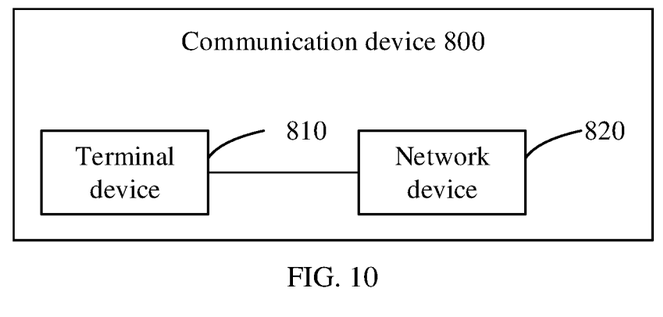
FIG. 10 is a schematic block diagram of a communication system according to an embodiment of the present application.

FIG. 10 is a schematic block diagram of a communication system 800 according to an embodiment of the present application, where the communication system 800 includes a terminal device 810 and a network device 820.

The terminal device 810 may be used to implement the corresponding functions implemented by the terminal device in the methods of the various embodiments of the present application, and the network device 820 may be used to implement the corresponding functions implemented by the network device in the methods of the various embodiments of the present application, which are not repeated here for brevity.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present application are generated. The computer may be a general purpose computer, a special purpose computer, a computer network, or other programmable device. The computer instructions may be stored on a computer readable storage medium or transmitted from one computer readable storage medium to another computer readable storage medium, for example, the computer instructions may be transmitted from a website site, computer, server or data center to another website site, computer, server or data center over a wire (e.g. coaxial cable, optical fiber, Digital Subscriber Line (DSL)) or wireless (e.g., infrared, wireless, microwave, etc.) means. The computer-readable storage medium can be any available medium that can be accessed by a computer or a data storage device such as a server, data center, etc. that includes one or more available media integration. The available medium may be a magnetic medium (e.g., a floppy disk, a hard disk, a magnetic tape), an optical medium (e.g., DVD), or a semiconductor medium (e.g., a Solid State Disk (SSD)), etc.

It should be understood that, in various embodiments of the present application, the size of the sequence numbers of the above-mentioned processes does not mean the sequence of execution, and the execution sequence of each process should be determined by its functions and internal logic, and should not constitute any limitation on the implementation procedure of the embodiments of the present application.

Those skilled in the art can clearly understand that, for the convenience and brevity of description, the specific working process of the above-described systems, apparatuses and units can refer to the corresponding processes in the foregoing method embodiments, which will not be repeated here.

The above are only specific embodiments of the present application, but the protection scope of the present application is not limited thereto. Any person skilled in the art can easily think of variations or substitutions within the technical scope disclosed in the present application, which should be covered by the scope of protection of the present application. Therefore, the scope of protection of the present application shall be stated to be subject to the scope of protection of the claims.

What is claimed is:

1. A method of auxiliary routing of a terminal device, comprising:
    sending, by the terminal device, first indication information to a network device, the first indication information indicating one or more desired services, the first indication information being used by the network device to select a first network function entity according to the first indication information, and the first network function entity being related to one or more designated functions associated with the one or more desired services.

2. The method of claim 1, wherein:
the first network function entity comprises an access and mobility management function (AMF).

3. The method of claim 1, wherein:
the first indication information is carried by a fifth step message Msg5, and
the Msg5 is carried by signaling radio bearer 1 (SRB1).

4. The method of claim 3, wherein:
the Msg5 comprises a first parameter, and
the first parameter corresponds to the one or more designated functions.

5. The method of claim 1, wherein:
a mapping relationship between the first indication information and the one or more designated functions comprises at least one of a one-to-one mapping, a one-to-many mapping, or a many-to-one mapping.

6. The method of claim 1, wherein:
the one or more designated functions comprise at least one of a function of a user performing an authentication service through a third-party entity or a function of a user subscription data online update service, an
the one or more desired services comprise at least one of the user performing the authentication service through the third-party entity or the user subscription data online update service.

7. A terminal device comprising:
a processor, and
memory storing instructions, which when executed by the processor, cause the processor to:
    send first indication information to a network device, the first indication information indicating one or more desired services, the first indication information being used by the network device to select a first network function entity according to the first indication information, and the first network function entity being related to one or more designated functions associated with the one or more desired services.

8. The terminal device of claim 7, wherein:
the first network function entity comprises an access and mobility management function (AMF).

9. The terminal device of claim 7, wherein:
the first indication information comprises a random access preamble, and
the random access preamble belongs to a first random access preamble set.

10. The terminal device of claim 9, wherein:
the first random access preamble set is generated based on an independent random access root sequence, or
the first random access preamble set is generated based on a common random access root sequence.

11. The terminal device of claim 7, wherein:
the first indication information is carried by a fifth step message Msg5, and
the Msg5 is carried by signaling radio bearer 1 (SRB1).

12. The terminal device of claim 11, wherein:
the Msg5 comprises a first parameter, and
the first parameter corresponds to the one or more designated functions.

13. The terminal device of claim 7, wherein:
a mapping relationship between the first indication information and the one or more designated functions comprises at least one of a one-to-one mapping, a one-to-many mapping, or a many-to-one mapping.

14. The terminal device of claim 7, wherein:
the one or more designated functions comprise at least one of a function of a user performing an authentication service through a third-party entity or a function of a user subscription data online update service, and
the one or more desired services comprise at least one of the user performing the authentication service through the third-party entity or the user subscription data online update service.

15. A network device, comprising:
a processor; and
memory storing instructions, which when executed by the processor, cause the processor to:
- receive first indication information sent by a terminal device, the first indication information indicating one or more desired services; and
- select a first network function entity according to the first indication information, the first network function entity being related to one or more designated functions associated with the one or more desired services.

16. The network device of claim 15, wherein:
the first network function entity comprises an access and mobility management function (AMF).

17. The network device of claim 15, wherein:
the first indication information is carried by a fifth step message Msg5, and
the Msg5 is carried by signaling radio bearer 1 (SRB1).

18. The network device of claim 17, wherein:
the Msg5 comprises a first parameter, and
the first parameter corresponds to the one or more designated functions.

19. The network device of claim 15, wherein:
a mapping relationship between the first indication information and the one or more designated functions comprises at least one of a one-to-one mapping, a one-to-many mapping, or a many-to-one mapping.

20. The network device of claim 15, wherein:
the one or more designated functions comprise at least one of a function of a user performing an authentication service through a third-party entity or a function of a user subscription data online update service, and
the one or more desired services comprise at least one of the user performing the authentication service through the third-party entity or the user subscription data online update service.

* * * * *